May 15, 1934.  E. G. DANIELS  1,958,421
METHOD OF MAKING SPHERICAL CONTAINERS
Filed Dec. 17, 1932   2 Sheets-Sheet 2
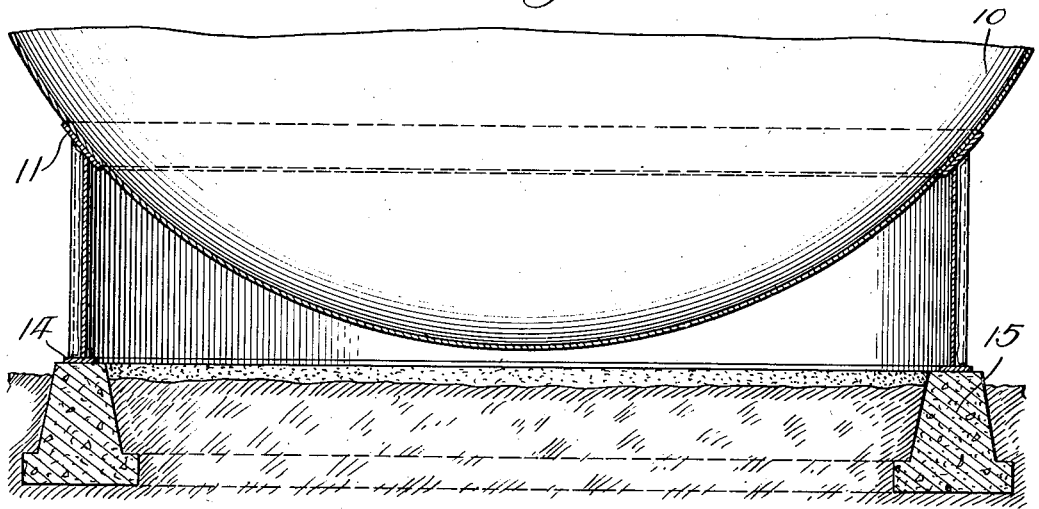
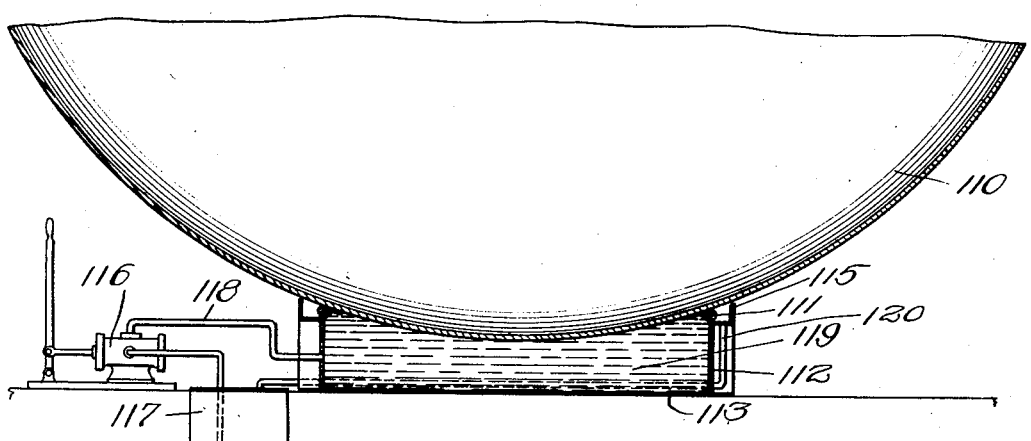
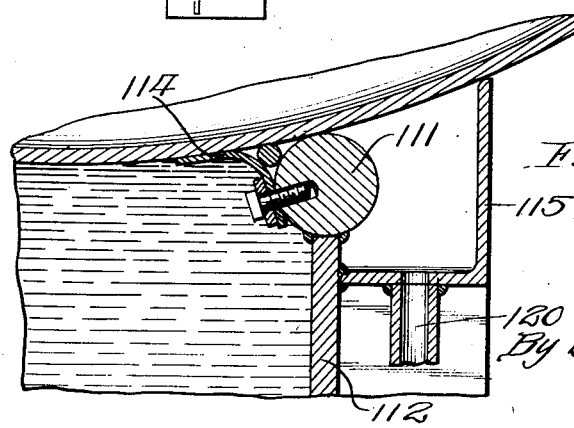
Inventor:
Edwin G. Daniels,
By Byrnes, Stein, Clinton & Miles,
Attys.

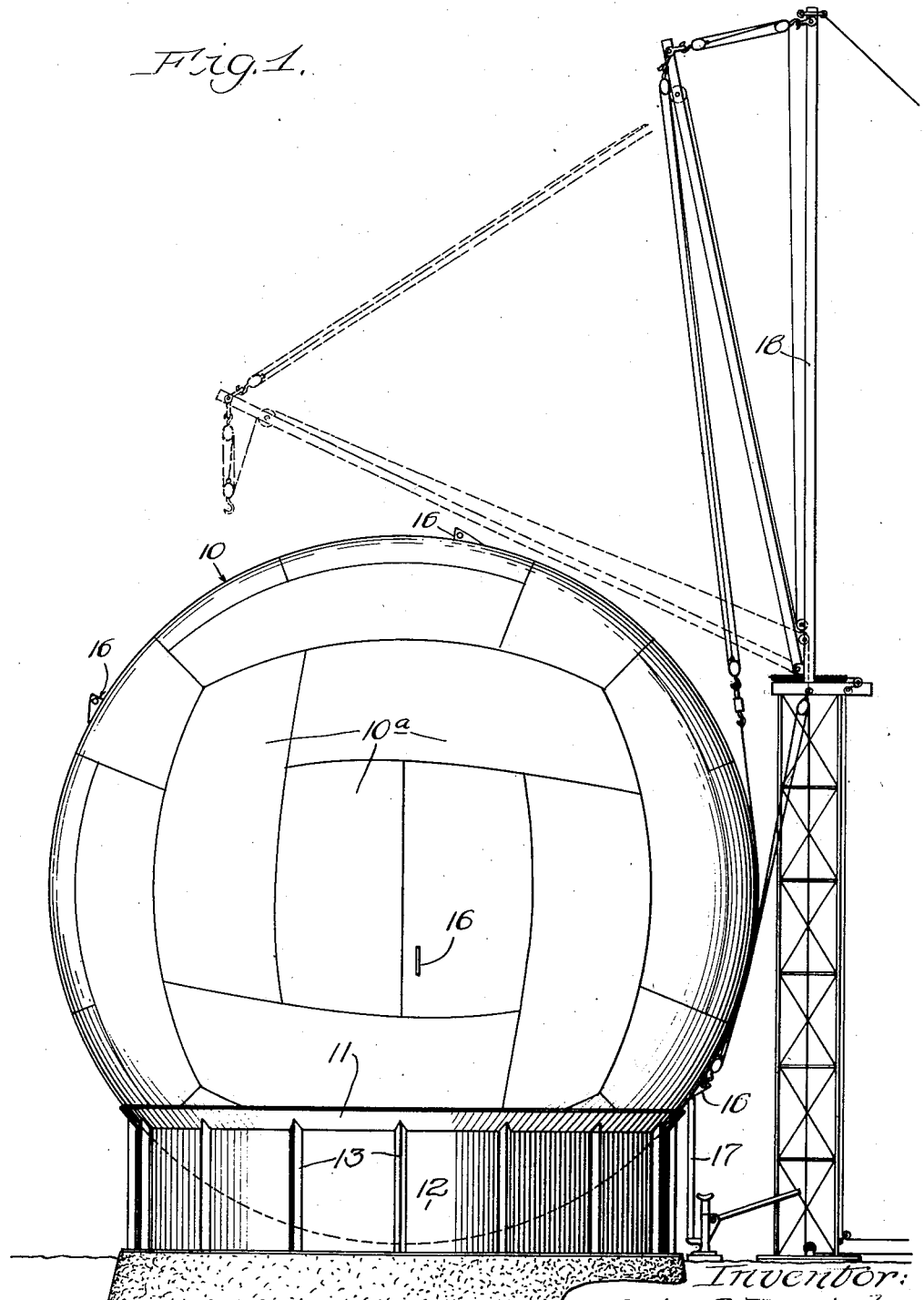

Patented May 15, 1934

1,958,421

UNITED STATES PATENT OFFICE 1,958,421

METHOD OF MAKING SPHERICAL CONTAINERS

Edwin G. Daniels, Chicago, Ill., assignor to Chicago Bridge & Iron Company, Chicago, Ill., a corporation of Illinois Application December 17, 1932, Serial No. 647,800

1 Claim. (Cl. 113—120)

This invention relates to improvements in a method of erecting spherical containers and, more especially, to such containers made of welded sheet metal, such as used, for example, in the storage of gases under pressure, volatile liquids, and other fluids.

Among the features of my invention is the provision of a support for the container which may be utilized during the erection process, such support facilitating rotation of the sphere while welding the seams thereof.

Spherical sheet metal containers of the kind referred to are made of sections of sheet metal welded together. In erecting the same, the sections are ordinarily first temporarily fastened with bolts or by tack welding to form the container. After this, the sections must be permanently welded. In welding the seams between the sections, it is necessary or desirable to have the plates in substantially horizontal position. In any event, when the plates are substantially horizontal, the welding of the seams is facilitated. It is more or less difficult to weld seams between plates in vertical position, especially when such seams are vertical. With the plates horizontal, the welding metal is more easily retained in the seams.

By using my invention, the support which later forms the permanent support for the container may be used during the erecting process and will facilitate rotation of the container to permit welding of the seams with the plates substantially in horizontal position.

By the use of my invention, there is also provided a permanent support for the container which will permit rotation of the same, thus facilitating painting, repairing, cleaning and inspection of the container.

Other features and advantages of my invention will appear more fully as I proceed with my specification.

In those forms of devices embodying the features of my invention shown in the accompanying drawings—

Figure 1 is a view in side elevation; Fig. 2 is a vertical sectional view of the bottom of the device of Fig. 1; Fig. 3 is a view similar to Fig. 2 showing a modified form; and Fig. 4 is an enlarged fragmentary view of a part of Fig. 3.

As shown in the drawings, 10 may indicate a substantially spherical sheet metal container formed of the plates 10ª, 10ª welded together. 11 indicates a beveled ring forming a support for the container. This ring, as here shown, is mounted upon the cylinder 12 which is reinforced by the vertical members 13, 13. The cylinder 12 may rest on a circular plate 14 supported on a suitable foundation 15.

In erecting the container of Figs. 1 and 2, the ring 11 is first erected. The plates 10ª are then temporarily fastened together to form the container. This temporary fastening may be accomplished in any manner well known in the art, for example, by the use of bolts, tack welding and the like. When thus temporarily assembled, the container is rotatably supported on the ring support 11.

Suitable lugs 16 are attached at various places to the container. These may be fastened on by welding and may be cut off when they interfere with the rotation of the sphere. Suitable means are provided for pulling or pushing on the lug 16 to rotate the sphere in the ring support 11. For example, a jack 17 may be used for this purpose or a derrick 18, or both together. As shown in Fig. 1, the jack 17 and derrick 18 are attached to one of the lugs 16 to exert an upward pull to rotate the sphere. It is to be understood that the seams may be welded on the outside at the top of the sphere or on the inside at the bottom where the plates are substantially horizontal. As this welding is carried on, the sphere is rotated so that the welding may always be substantially at the top or the bottom. A suitable manhole (not shown) is provided to permit work inside of the sphere.

In Figs. 3 and 4 I have shown means for introducing fluid (for example, water) under pressure under the sphere in order to assist in rotating the same. For example, as shown in Figs. 3 and 4, the sphere is represented by 110. The ring support 111 is here shown as a circular bar resting upon the cylinder 112. 113 indicates a bottom for the cylinder 112. On the inside of the ring 111 is a flexible member 114 to assist in forming a water seal. Outside of the cylinder 112 is a trough 115 to catch water that escapes under the sphere. 116 indicates a pump for drawing water from the sump or supply tank 117 and forcing the same through the pipe 118 under pressure into the cylinder 112. The water is indicated by 119. Water escaping around the joint flows into the trough 115 from which it flows through the pipe 120 back into the sump or supply tank 117.

In the construction shown in Figs. 3 and 4, water is forced under pressure into the cylinder 112 to take some of the weight of the sphere so that it may be more easily rotated upon the ring support 111.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new and desire to secure by Letters Patent is:

The method of erecting a closed sheet metal spherical container consisting of first temporarily fastening together sheet metal plates to form said container and rotatably supporting the same on a ring support, then introducing fluid under pressure under said container inside of said ring support to facilitate rotation of the container on said ring support, and then rotating said container on said ring support while permanently welding the seams between the sheet metal plates to permit placing of the plates in substantially horizontal position for such permanent welding.

EDWIN G. DANIELS.